(12) United States Patent
Hoshino et al.

(10) Patent No.: US 8,629,225 B2
(45) Date of Patent: Jan. 14, 2014

(54) POLY (N-ALKYLCARBAZOLE) COLUMNAR STRUCTURE AND METHOD FOR PRODUCING THE SAME

(75) Inventors: Katsuyoshi Hoshino, Chiba (JP); Kazuki Takizawa, Chiba (JP); Katsuyuki Murashiro, Ichihara (JP); Toshiki Komatsu, Ichihara (JP)

(73) Assignees: National University Corporation Chiba University, Chiba (JP); JNC Corporation, Tokyo (JP)

( * ) Notice: Subject to any disclaimer, the term of this patent is extended or adjusted under 35 U.S.C. 154(b) by 328 days.

(21) Appl. No.: 13/040,875

(22) Filed: Mar. 4, 2011

(65) Prior Publication Data

US 2011/0274925 A1    Nov. 10, 2011

(30) Foreign Application Priority Data

Mar. 12, 2010    (JP) ................. 2010-056198

(51) Int. Cl.
*C08F 26/06*    (2006.01)
(52) U.S. Cl.
USPC .......................... 526/259; 526/172

(58) Field of Classification Search
USPC .................................. 526/259, 172
See application file for complete search history.

(56) References Cited

U.S. PATENT DOCUMENTS

2003/0092880 A1* 5/2003 Leclerc et al. ................ 528/422
2011/0017958 A1* 1/2011 Hoshino et al. ............... 252/512

FOREIGN PATENT DOCUMENTS

| JP | 02-036995 | 2/1990 |
| JP | 2007-009049 | 1/2007 |
| JP | 2008-239835 | 10/2008 |

OTHER PUBLICATIONS

Gupta et al. (Synthetic Metals 160 (2010) 523-528).*
Office Action for JP Patent Application No. 2010-056198, mailed May 28, 2013, along with an English language translation.

* cited by examiner

*Primary Examiner* — Shane Fang
(74) *Attorney, Agent, or Firm* — Greenblum & Bernstein, P.L.C.

(57) ABSTRACT

A poly(N-alkylcarbazole) columnar structure having electroconductivity is provided. The poly(N-alkylcarbazole) columnar structure having electroconductivity may be produced by electrolytically polymerizing an N-alkylcarbazole in a particular solvent.

13 Claims, 22 Drawing Sheets

POLY (N-ALKYLCARBAZOLE) COLUMNAR STRUCTURE AND METHOD FOR PRODUCING THE SAME

BACKGROUND OF THE INVENTION

1. Field of the Invention

The present invention relates to a novel resin structure having electroconductivity, and more specifically relates to a poly(N-alkylcarbazole) columnar structure and a method for producing the same.

2. Related Art

An electroconductive polymer, such as polyaniline, polypyrrole and polythiophene, is expected to be applied to various fields of art as a functional material owing to the properties thereof, such as the redox property and the doping and dedoping property. A nanosized material of the electroconductive polymer is expected to be applied to various purposes, such as a field emission material used in a field emission device of a field emission display (FED) or the like, a wiring material, a sensor, an electrochemical capacitor, a probe for a probe microscope, and a catalyst carrier, owing to the electroconductivity thereof.

As for the nanosized electroconductive polymer, a nanosized electroconductive polymer of polypyrrole and polythiophene has been produced by an electrochemical process using nanocylinders (as described, for example, in JP-A-2008-239835). However, the method is not suitable for mass production due to the use of a supercritical fluid or a subcritical fluid as an electrolytic solvent, which requires complicated equipments and increased cost. Furthermore, the method involves removal of a template, which complicates the process, and the template is one-time use, which increases the production cost.

Carbon nanotubes and metal nanowire have been developed in recent years, and promote interest in electroconductive nanomaterials. A nanomaterial having an average diameter of from several nanometers to several hundred nanometers and an average length of approximately 1 μm or more has been applied to such purposes as an electroconductive material, an electron emission device and a template for carbon nanotubes. As a production method of a nanomaterial of an electroconductive polymer, only methods using nanocylinders or a template have been currently practiced, as described, for example, in JP-A-2008-239835.

Carbazole, a heterocyclic compound represented by a chemical formula $C_{12}H_9N$, is a compound having electroconductivity. An N-alkylcarbazole, which is a derivative of carbazole, has been used as a functional material for an LED through reaction with cellulose in a solvent (as described, for example, in JP-A-2007-009049).

PRIOR ART DOCUMENTS

Patent Document

Patent Document 1: JP-A-2008-239835
Patent Document 2: JP-A-2007-009049

SUMMARY OF THE INVENTION

An object of the invention is to provide a novel electroconductive material that can be produced conveniently in a large amount.

The inventors have developed an organic transparent conductor based on the knowledge that a poly(N-alkylcarbazole) is dissolved in an organic solvent. As a result of further investigations of the organic transparent conductor, it has been found that a columnar structure of a poly(N-alkylcarbazole) having electroconductivity is obtained by electrolytically polymerizing an N-alkylcarbazole in a particular solvent, and thus the invention has been completed.

According to aspects of the invention, the following embodiments are provided.

(1) A poly(N-alkylcarbazole) columnar structure.

(2) The poly(N-alkylcarbazole) columnar structure according to the item (1), wherein the columnar structure has a diameter of from 0.1 to 10 μm.

(3) A poly(N-alkylcarbazole) columnar structure formed by electrolytically polymerizing an N-alkylcarbazole in an alcohol solvent.

(4) The poly(N-alkylcarbazole) columnar structure according to the item (3), wherein the alcohol solvent contains from 1 mM to 10 M of a supporting electrolyte.

(5) The poly(N-alkylcarbazole) columnar structure according to the item (4), wherein the supporting electrolyte is tetrabutylammonium perchlorate.

(6) The poly(N-alkylcarbazole) columnar structure according to any one of the items (1) to (5), wherein the columnar structure is a hollow columnar structure.

(7) A method for producing a poly(N-alkylcarbazole) columnar structure by polymerizing an N-alkylcarbazole, the method containing a step of electrolytically polymerizing the N-alkylcarbazole in an alcohol solvent containing a supporting electrolyte.

The poly(N-alkylcarbazole) columnar structure of the invention, which is a novel polymer material, has electroconductivity and is expected to be applied to various fields of art as a functional material. The poly(N-alkylcarbazole) columnar structure can be produced by a convenient production method without the use of special cylinders or application of high pressure. The poly(N-alkylcarbazole) columnar structure can be advantageously produced in a large amount at one time corresponding to the area of the working electrode used on electrolytic polymerization, and thus is excellent in productivity.

The poly(N-alkylcarbazole) columnar structure of the invention has a large surface area owing to the columnar structure in nanosize or microsize. In particular, the poly(N-alkylcarbazole) columnar structure of the invention having a hollow structure has a remarkably increased surface area as compared to that having a simple columnar structure. Owing to the large surface area, the poly(N-alkylcarbazole) columnar structure of the invention is useful as (1) an electroconductive material, such as an electromagnetic wave absorbing material, (2) a wiring material, such as a cable, (3) a material for a secondary battery and a capacitor, (4) a catalyst, (5) antibacterial fibers, (6) a probe for a probe microscope, (7) an electron emission source, and the like. The poly(N-alkylcarbazole) columnar structure is suitable for mixing with various materials owing to the nanosized or microsized structure thereof.

BRIEF DESCRIPTION OF THE DRAWINGS

FIG. 3-1 is an enlarged micrograph showing the poly(N-methylcarbazole) columnar structure in FIG. 3.

FIG. 3-2 is a enlarged micrograph showing the poly(N-methylcarbazole) columnar structure in FIG. 3.

FIG. 7-1 is an enlarged micrograph showing the poly(N-methylcarbazole) columnar structure in FIG. 7.

FIG. 7-2 is a further enlarged micrograph showing the poly(N-methylcarbazole) columnar structure in FIG. 7-1.

FIG. 20-1 is an enlarged micrograph showing the poly(N-methylcarbazole) columnar structure in FIG. 20.

FIG. 20-2 is a further enlarged micrograph showing the poly(N-methylcarbazole) columnar structure in FIG. 20-1.

FIG. 22-1 is an enlarged micrograph showing the poly(N-methylcarbazole) columnar structure in FIG. 22.

FIG. 22-2 is a further enlarged micrograph showing the poly(N-methylcarbazole) columnar structure in FIG. 22-1.

PREFERRED EMBODIMENTS OF THE INVENTION

Figure 1:
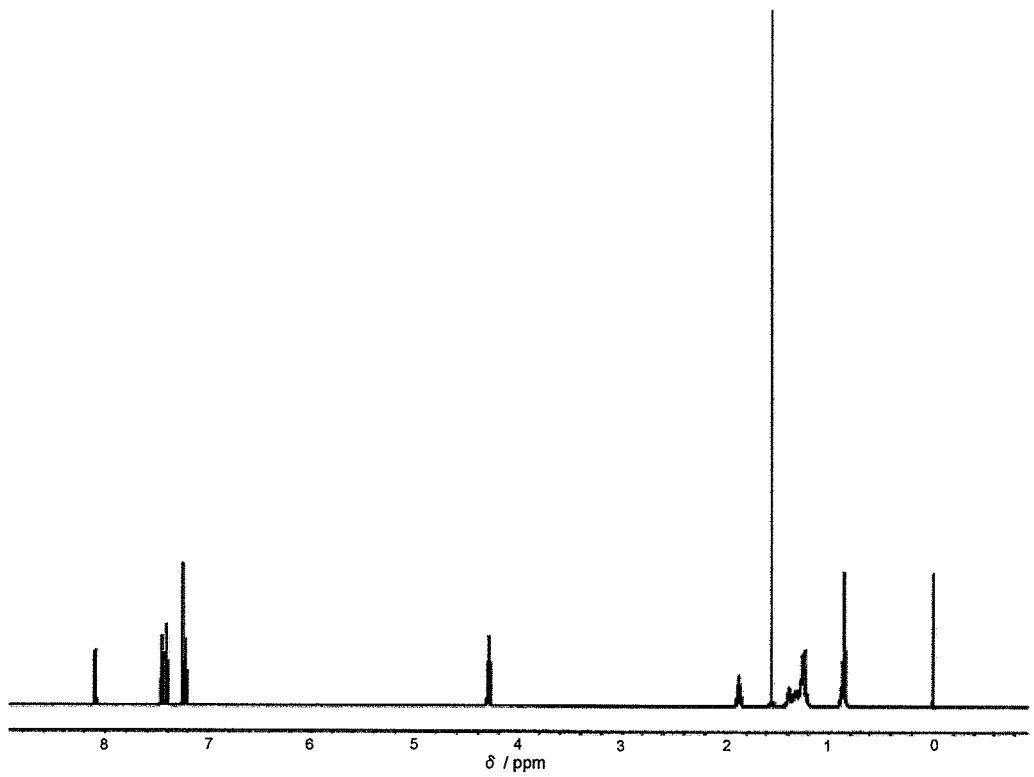
FIG. 1 is a diagram showing the NMR spectrum chart of the N-n-octylcarbazole produced in the example.

The invention relates to a columnar structure of a poly(N-alkylcarbazole). The poly(N-alkylcarbazole) referred herein is an N-alkylcarbazole polymer having a polymerization degree of 2 or more obtained by polymerizing at least one kind of an N-alkylcarbazole represented by the following formula (1):

[Chem 1]

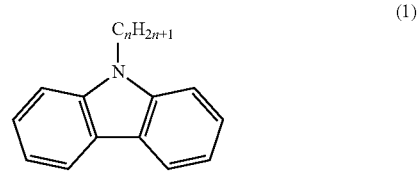

(1)

In the formula (1), n represents an integer of 1 or more. In the alkyl ($C_nH_{2n+1}$), one or plural hydrogen atoms may be replaced by at least one kind of a group selected from hydroxyl, carboxyl, sulfo and amino, and the carbon atom bonded to the nitrogen atom of carbazole is preferably a primary carbon atom or a secondary carbon atom.

The poly(N-alkylcarbazole) obtained in the invention may be a homopolymer obtained by polymerizing one kind of an N-alkylcarbazole or may be a copolymer obtained by polymerizing two or more kinds of N-alkylcarbazoles. The poly(N-alkylcarbazole) may be used as one kind of the poly(N-alkylcarbazole) or as a mixture of two or more kinds the poly(N-alkylcarbazole) that are different from each other in carbon number. The polymerization degree of the poly(N-alkylcarbazole) is preferably from 2 to 1,000, more preferably from 2 to 100, and particularly preferably from 4 to 22.

A poly(N-alkylcarbazole) has been synthesized by the inventors, as described in JP-A-2010-257797. The poly(N-alkylcarbazole) having been synthesized by the inventors is in the form of a membrane structure, but the poly(N-alkylcarbazole) of the invention is different from the membrane structure and is in the form of a nanosized or microsized columnar structure. The term "columnar structure" referred herein is a concept for distinguishing from the membrane structure and includes a cylindrical column and a polygonal column, such as a triangular column, a rectangular column and the like. A hollow column is also included in the columnar structure of the invention. Shapes that are ordinarily referred to as "tube", "wire" and the like are included in the columnar structure of the invention. In the case where a nanosized or microsized material is used, the material preferably has a hollow structure, i.e., is preferably in the form of a tube, since an increased surface area can be obtained.

According to the invention, a minute columnar structure, which is expressed by a nanosized columnar structure, can be produced. The diameter of the structure may be from 0.1 to 10 μm, preferably from 0.1 to 5 μm, and more preferably from 0.1 to 1.7 μm. The length of the structure is not particularly limited and may be 1 μm or more. In the invention, the diameter of the structure means the diameter of the cylindrical column, and for the rectangular column, means the length of the longest diagonal line on the cross section of the rectangular column. For the hollow structure, the diameter of the structure means the outer diameter. The dimension of the structure of the invention can be measured by observation with an electron microscope.

In the case where the columnar structure of the invention is used as a nanosized material, it is preferred to use as an aggregate of the structures having an average diameter of several micrometers and an average length of 1 μm or more.

The poly(N-alkylcarbazole) columnar structure of the invention can be produced by polymerizing an N-alkylcarbazole by electrolytic polymerization using a particular solvent, specifically an alcohol solvent. According to the production method, the poly(N-alkylcarbazole) columnar structure is produced on the working electrode.

The poly(N-alkylcarbazole) columnar structure of the invention thus produced can be confirmed with an electron microscope, such as a scanning electron microscope (SEM), and has a nanosized or microsized tube or wire shape. The columnar structure has electroconductivity and thus is expected to be applied to various fields of art. The production method will be described in detail below.

Synthesis of N-Alkylcarbazole

An N-alkylcarbazole having alkyl bonded to the nitrogen atom of carbazole can be synthesized by hydrogen halide elimination reaction of carbazole and an alkyl halide as an alkylation agent in the presence of a strongly basic alkali metal compound, such as sodium hydride. In alternative, an N-alkylcarbazole can be synthesized by potassium halide elimination reaction of a potassium salt of carbazole and an alkyl halide. The alkyl of the N-alkylcarbazole is not particularly limited and may be alkyl having 1 or more carbon atoms (i.e., n in the formula (1) is 1 or more). The alkyl is preferably alkyl having 22 or less (i.e., n in the formula (I) is 22 or less) in view of commercial availability. The carbon number of the alkyl is more preferably from 1 to 8, and particularly preferably from 1 to 4. Specific preferred examples of the N-alkylcarbazole include N-methylcarbazole, N-ethylcarbazole, N-propylcarbazole, N-isopropylcarbazole and N-butylcarbazole. One or plural hydrogen atoms of the alkyl may be replaced by at least one kind of a group selected from hydroxyl, carboxyl, sulfo and amino.

Alkyl Halide

The alkyl halide as an alkylation agent is available from the reagent manufacturers. An alkyl monobromide is conveniently handled in laboratories from the standpoint of reactivity and richness in kind of alkyl. Specific examples of the available alkyl monobromide include 1-bromopropane, 2-bromopropane, 1-bromobutane, 2-bromobutane, 1-bromo-2-methylpropane, 2-bromo-2-methylpropane, 1-bromo-3-methylbutane, 1-bromohexane, 2-bromohexane, 3-bromohexane, 1-bromomethylpentane, 1-bromoheptane, 3-bromoheptane, 4-bromoheptane, 1-bromo-5-methylhexane, 1-bromo-2-ethylhexane, 1-bromooctane, 2-bromooctane, 1-bromononane, 2-bromononane, 1-bromodecane, 1-bromoundecane, 1-bromododecane, 2-bromododecane, 1-bromotridecane, 1-bromotetradecane, 2-bromotetradecane, 1-bromopentadecane, 1-bromoheptadecane, 1-bromo-2-methylhexadecane, 1-bromooctadecane, 1-bromoeicosane and 1-bromodocosane, which are available from Tokyo Kasei Kogyo Co., Ltd., Sigma-Ardrich Japan Co., Ltd., Lancaster Synthesis, Ltd. and the like.

Synthesis of Alkyl Halide

In addition to the alkyl monohalide mentioned above, the alkyl halide may be obtained by hydrogen halide addition reaction of an alkene. The reaction can be easily performed by adding a hydrogen halide to an alkene solution. For providing the alkyl halide by the hydrogen halide addition reaction of an alkene, it is convenient to synthesize by hydrogen iodide addition reaction of an alkene with an alkyl monoiodide according to the method described in Organic Synthesis IV, pp. 543-544, published by John Wiley & Sons, Inc. (1962).

Examples of the available alkene include 3,3-dimethyl-1-butene, 2-hexene, 3-hexene, 4-methyl-1-pentene, 4-methyl-2-pentene, 3,3-dimethyl-1-pentene, 4,4-dimethyl-1-pentene, 2-heptene, 3-heptene, 3-methyl-1-hexene, 4-methyl-1-hexene, 4-methyl-2-hexene, 5-methyl-1-hexene, 5-methyl-2-hexene, 3,3-dimethyl-1-hexene, 3,4-dimethyl-1-hexene, 5-methyl-2-heptene, 5-methyl-3-heptene, 2-octene, trans-3-octene, trans-4-octene, 2-nonene, 4-nonene, 3,3,5-trimethyl-1-hexene, cis-2-decene, cis-4-decene, cis-5-decene, 5-dodecene, 7-tetradecene and cis-9-tricosene, which are available from Tokyo Kasei Kogyo Co., Ltd. and the like.

The following alkyl halides are obtained by the hydrogen iodide addition reaction of an alkene: 2-iodo-3,3-dimethylbutane, 3-iodohexane, 4-bromohexane, 2-iodo-4-methylpentane, 3-iodo-4-methylpentane, 2-iodo-3,3-dimethylpentane, 2-iodo-4,4-dimethylpentane, 3-iodoheptane, 4-iodoheptane, 2-iodo-3-methylhexane, 2-iodo-4-methylhexane, 3-iodo-4-methylhexane, 2-iodo-5-methylhexane, 3-iodo-5-methylhexane, 2-iodo-3,3-dimethylhexane, 2-iodo-3,4-dimethylhexane, 2-iodo-4,4-dimethylhexane, 3-iodo-5-methylheptane, 4-iodo-5-methylheptane, 3-iodooctane, 4-iodooctane, 5-iodooctane, 3-iodononane, 5-iodononane, 2-iodo-3,3,5-trimethylhexane, 3-iododecane, 4-iododecane, 6-iododecane, 6-iodododecane, 8-iodotetradecane and 10-iodotricosane.

Electrolytic Polymerization

The electrolytic polymerization referred herein is a polymerization method of polymerizing a polymerizable monomer by the usual way.

The N-alkylcarbazole synthesized by the aforementioned method is dissolved in a specific solvent, particularly an alcohol solvent. The concentration of the N-alkylcarbazole in the solvent is preferably from 0.002 to 200 parts by weight, and more preferably from 0.02 to 20 parts by weight, per 100 parts by weight of the solvent. When the concentration of the N-alkylcarbazole is in the range, the polymerization reaction can be performed at a sufficient reaction rate.

In the case where an alcohol solvent is used as the solvent, a mixed solvent of the alcohol solvent and water may be used. The volume ratio of alcohol solvent and water in the mixed solvent may be from 1/99 to 99/1. Examples of the alcohol solvent used as the solvent include methanol, ethanol, propanol and butanol, and methanol and ethanol are particularly preferred. In addition to the alcohol solvent, γ-butyrolactone, propylene carbonate, anisole, N-methylpyrrolidone and the like may also be used as the solvent depending on the kind of the N-alkylcarbazole.

The solvent preferably contains a supporting electrolyte. Examples of the supporting electrolyte include a sodium salt, such as $NaClO_4$, $NaBF_4$, $NaPF_6$, $NaCl$, $NaBr$, $NaI$, $Na_2SO_4$, $NaNO_3$ and $CH_3COONa$, a lithium salt, such as $LiClO_4$, $LiBF_4$, $LiPF_6$, $LiCl$, $LiBr$, $LiI$, $Li_2SO_4$, $LiNO_3$ and $CH_3COOLi$, a potassium salt, such as $KClO_4$, $KBF_4$, $KPF_6$, $KCl$, $KBr$, $KI$, $K_2SO_4$, $KNO_3$ and $CH_3COOK$, and a salt of a divalent metal (such as a calcium salt and a magnesium salt), and also include a tetraalkylammonium salt such as $(C_4H_9)_4NClO_4$, $(C_3H_7)_4NClO_4$, $(C_2H_5)_4NClO_4$ and $(CH_3)_4NClO_4$. Among these, tetrabutylammonium perchlorate represented by $(C_4H_9)_4NClO_4$ is preferred since it is excellent in resolvability to provide wide range for concentration control, is inexpensive, and is very inert to the electrode reaction and thus does not impair formation of the columnar structure.

The amount of the supporting electrolyte added is not particularly limited as far as the electrochemical reaction proceeds, and is preferably from 0.001 to 5 M, more preferably from 0.01 to 1 M, and particularly preferably from 0.01 to 0.5 M. In the case where the amount of the supporting electrolyte is in the range, the formation of an electric double layer, which is the driving force of the electrolytic polymerization of the N-alkylcarbazole, can be sufficiently performed.

The working electrode may be any electroconductive material that withstands electrochemical oxidation, and examples of the usable material include a metal, such as Pt, Au, Co, Cu, Al, Ni and stainless steel, and a carbon material, such as graphite, carbon nanotubes, a fullerene and a diamond-like carbon (DLC) film. The working electrode may also be an electroconductive oxide, such as indium tin oxide (ITO), and electroconductive plastics. The counter electrode may be any material that does not contaminate the electrolytic solution due to dissolution or the like, and preferred examples thereof include a platinum plate, a platinum wire and a platinum net. The counter electrode may also be other materials that withstand electrochemical reduction, and examples thereof include gold, carbon and stainless steel.

The voltage applied between the working electrode and the counter electrode is preferably from +0.5 to +3.0 V, and more preferably from +1.0 to +2.0 V, with respect to the saturated calomel reference electrode. The voltage within the range facilitates formation of the polymer. The voltage applied between the anode and the cathode when the reference electrode is not used is preferably from +0.9 to +4.0 V, and more preferably from +1.0 to +3.0 V, due to the same reasons. In the case where the applied voltage is in the range when the reference electrode is not used, the electrolytic polymerization of the poly(N-alkylcarbazole) can be performed by passing a constant current between the anode and the cathode.

The electrolytic polymerization in this embodiment may be performed in the air, but is preferably performed in a nitrogen atmosphere and more preferably under bubbling with nitrogen, for minimizing the influence of oxygen in the air.

The polymerization temperature of the electrolytic polymerization in the embodiment is not particularly limited and is preferably from −40 to 40° C. from the standpoint that the poly(N-alkylcarbazole) columnar structure having high electroconductivity is produced. The polymerization temperature is more preferably from 0 to 40° C., and particularly preferably from 10 to 40° C., for increasing the amount of the columnar structure formed.

The poly(N-alkylcarbazole) columnar structure of the invention thus produced by the method described above is formed as a structure in the form of a column on the working electrode. The size thereof is from 0.1 to 10 μm in diameter, which is clearly distinguished from the poly(N-alkylcarbazole) in the form of a membrane. In the case where the columnar structure is used as a nanosized material, the diameter thereof is preferably from 0.1 to 5 μm, and more preferably from 0.1 to 1.7 μm.

The length of the columnar structure is not particularly limited and is preferably 1 μm or more. The upper limit of the length is not particularly limited and is preferably 1 mm or less, and more preferably 100 μm or less, in view of the handleability of the material.

The poly(N-alkylcarbazole) columnar structure preferably has a hollow structure since a large surface area can be obtained. In this case, the thickness of the tube wall is preferably 1 nm or more.

The poly(N-alkylcarbazole) columnar structure thus obtained has electroconductivity and a large surface area and thus is expected to be applied to various fields of art as a nanosized or microsized electroconductive material.

EXAMPLE

The invention will be described with reference to examples below, but the invention is not limited thereto. The poly(N-alkylcarbazole) columnar structure was produced based on the embodiments mentioned above for confirming the advantages of the invention.

Synthesis of Alkylation Agent

Alkylation agents used for producing an N-alkylcarbazole were alkyl monobromides available from Tokyo Kasei Kogyo Co., Ltd., Sigma-Ardrich Japan Co., Ltd. and Lancaster Synthesis, Ltd. Alkylation agents that were not available as reagents were synthesized by hydrogen iodide addition reaction of an alkene according to the method described in Organic Synthesis IV, pp. 543-544, published by John Wiley & Sons, Inc. (1962).

3 equivalents of potassium iodide and 4.3 equivalents of 95% by weight phosphoric acid were added to 1 equivalent of an alkene as a raw material, and the mixture was heated to 80° C. for 3 hours under stirring. The 95% by weight phosphoric acid was prepared by adding 98% by weight phosphoric acid (available from Tokyo Kasei Kogyo Co., Ltd.) to 85% by weight phosphoric acid. After cooling the reaction mixture, water and petroleum ether were added thereto, and after stirring, the petroleum ether layer was isolated. The petroleum ether layer was decolored with 10% by weight sodium thiosulfate, rinsed with a saturated sodium chloride aqueous solution, and then dried over anhydrous sodium sulfate. After evaporating petroleum ether, an alkyl monoiodide was obtained by distillation under reduced pressure.

Synthesis of N-Alkylcarbazole

Carbazole was dissolved in a mixed solvent containing tetrahydrofuran and N,N-dimethylformamide (3/1 by volume), and the alkylation agent (i.e., the alkyl bromide or the alkyliodide) obtained above was added to the solution in an amount of 1 equivalent per 1 equivalent of carbazole, to which a 60% by weight sodium hydride dispersion in mineral oil ("Sodium Hydride", a trade name, available from Kanto Chemical Co., Inc.) corresponding to 1.5 equivalents of sodium hydride was gradually added thereto under stirring, followed by stirring at room temperature for 1 hour. For terminating the reaction, methanol was added to the reaction mixture until no bubble was formed, and then the solvent was removed by distillation under reduced pressure. Dichloromethane was added to the resulting residue, which was then rinsed with 3N hydrochloric acid and water. The residue was dried over anhydrous magnesium sulfate and then filtered. The solvent contained in the filtrate was removed under vacuum, and the resulting residue was purified by silica gel column chromatography with hexane as a developing solvent.

Synthesis of N-n-octylcarbazole

A synthesis method of N-n-octylcarbazole as a monomer for producing poly(N-n-octylcarbazole) is specifically described.

Carbazole (6.0 g, 0.036 mol, available from Tokyo Kasei Kogyo Co., Ltd.) was dissolved in a mixed solvent containing tetrahydrofuran (30 mL) and N,N-dimethylformamide (10 mL), and 1-bromooctane (3.95 g, 0.036 mol, available from Tokyo Kasei Kogyo Co., Ltd.) was added to the solution, to which a 60% by weight sodium hydride dispersion in mineral oil (2.16 g, 0.054 mol, "Sodium Hydride", a trade name, available from Kanto Chemical Co., Inc.) was gradually added thereto at room temperature (approximately 20° C.), followed by stirring for 1 hour for completing the reaction.

After completing the reaction, methanol was added to the resulting reaction solution for terminating the reaction until no bubble was formed. After removing the solvent in the reaction solution with an evaporator, the concentrated product was extracted with methylene chloride, and the organic layer was rinsed with 3N hydrochloric acid and water, dried over anhydrous magnesium sulfate, and then filtered. Methylene chloride contained in the filtrate was removed with an evaporator, and the resulting residue was purified by silica gel column chromatography with hexane as a developing solvent. Hexane was removed with an evaporator, thereby providing a transparent liquid (8 g, yield: 80%), which was confirmed as N-n-octylcarbazole with H-NMR. The purity of the product was 99.5% as confirmed with high-pressure liquid chromatography (HPLC). The NMR spectrum chart is shown in FIG. 1.

N-methylcarbazole and N-ethylcarbazole used in the examples were those available from Tokyo Kasei Kogyo Co., Ltd.

Measurement of Diameter of Poly(N-alkylcarbazole) Columnar Structure

In an SEM micrograph of the poly(N-alkylcarbazole) columnar structure, an arbitrary region containing from 10 to 100 of the columnar structures was set corresponding to the size of the columnar structure. The diameters of 10 poly(N-alkylcarbazole) columnar structures within the region were measured, and the arithmetic average thereof was designated as the diameter.

Example 1

Figure 2:
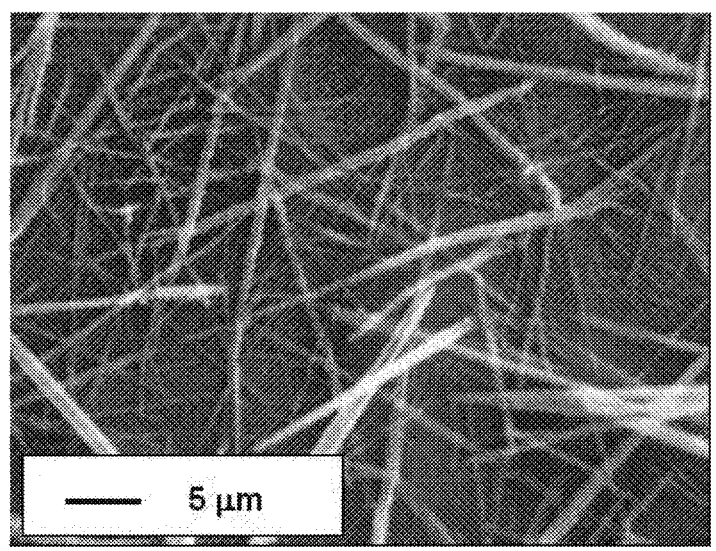
FIG. 2 is a micrograph showing the poly(N-methylcarbazole) columnar structure produced under the condition of −20° C. in Example 1.
Figure 3:
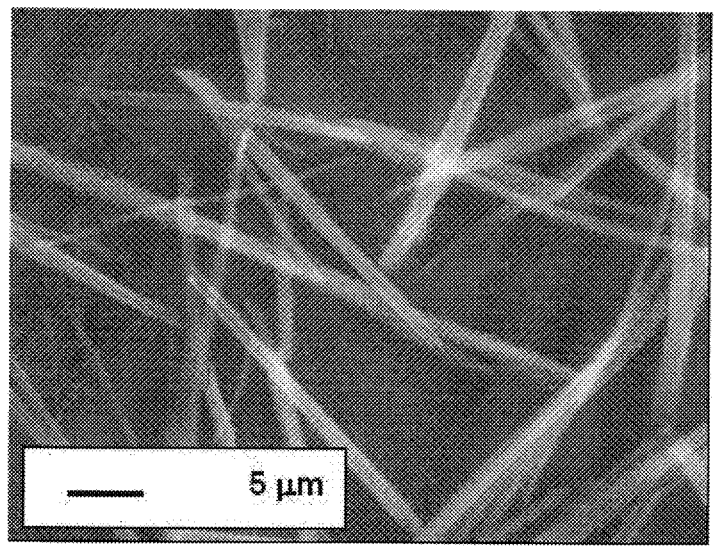
FIG. 3 is a micrograph showing the poly(N-methylcarbazole) columnar structure produced under the condition of −10° C. in Example 1.
Figures 1, 3:
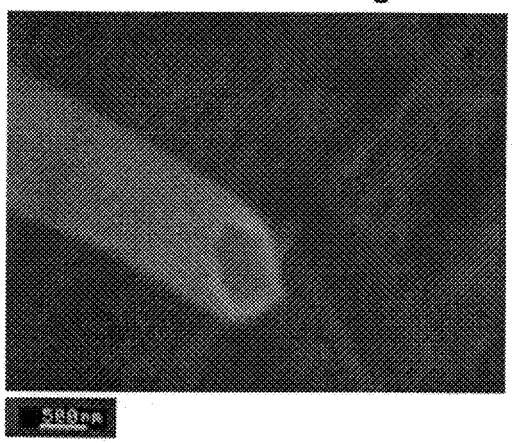
Figures 2, 3:
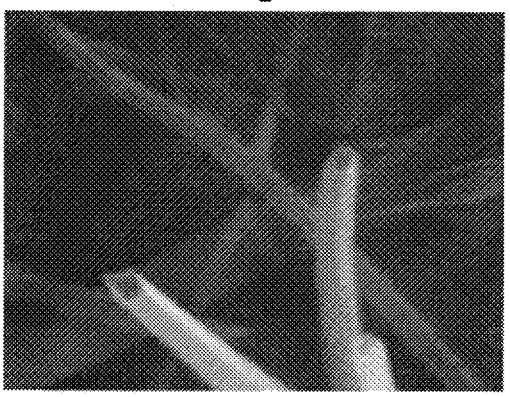
Figure 4:
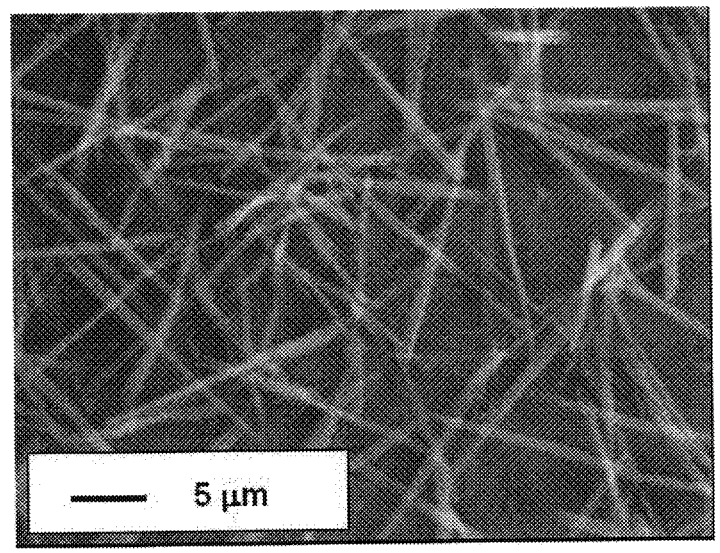
FIG. 4 is a micrograph showing the poly(N-methylcarbazole) columnar structure produced under the condition of 0° C. in Example 1.
Figure 5:
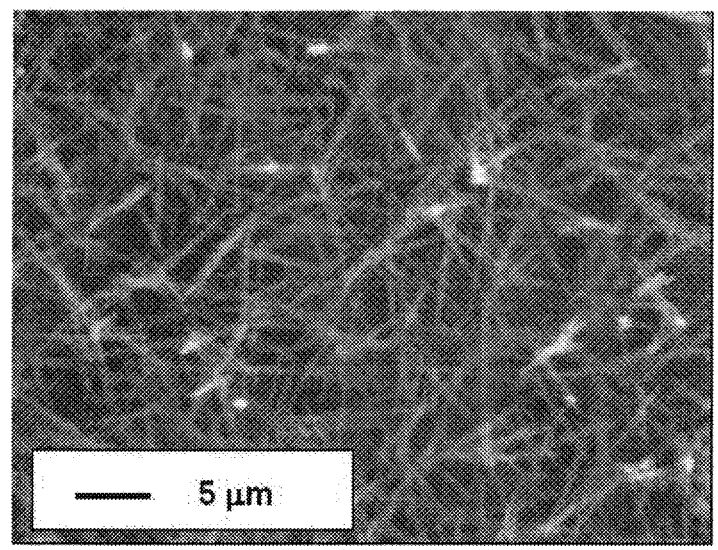
FIG. 5 is a micrograph showing the poly(N-methylcarbazole) columnar structure produced under the condition of 10° C. in Example 1.
Figure 6:
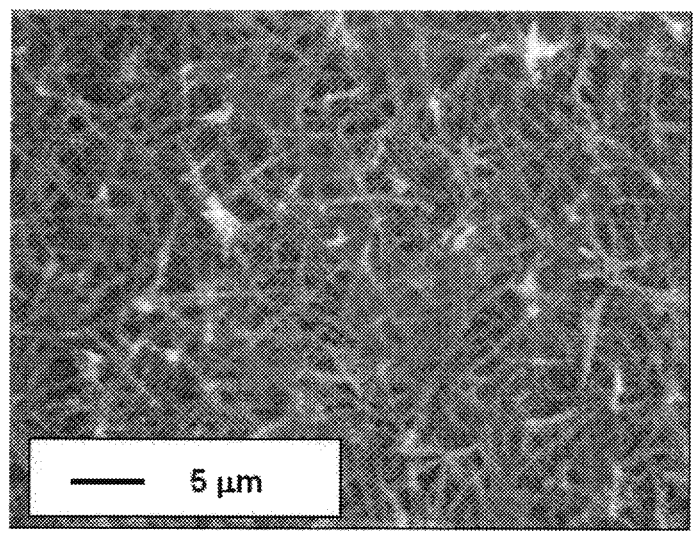
FIG. 6 is a micrograph showing the poly(N-methylcarbazole) columnar structure produced under the condition of 20° C. in Example 1.
Figure 7:
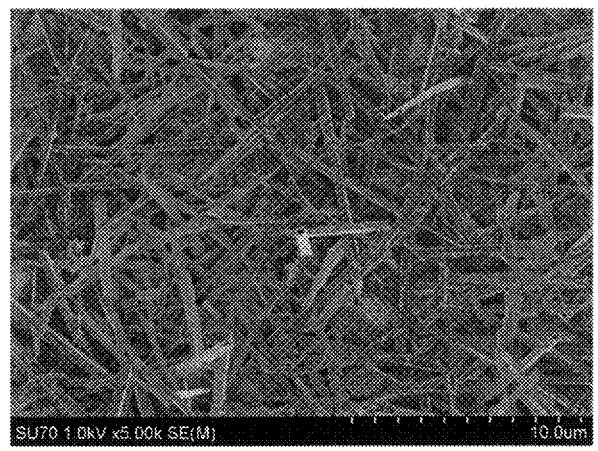
FIG. 7 is a micrograph showing the poly(N-methylcarbazole) columnar structure produced under the condition of 40° C. in Example 1.
Figures 1, 7:
Figures 2, 7:
Figure 8:
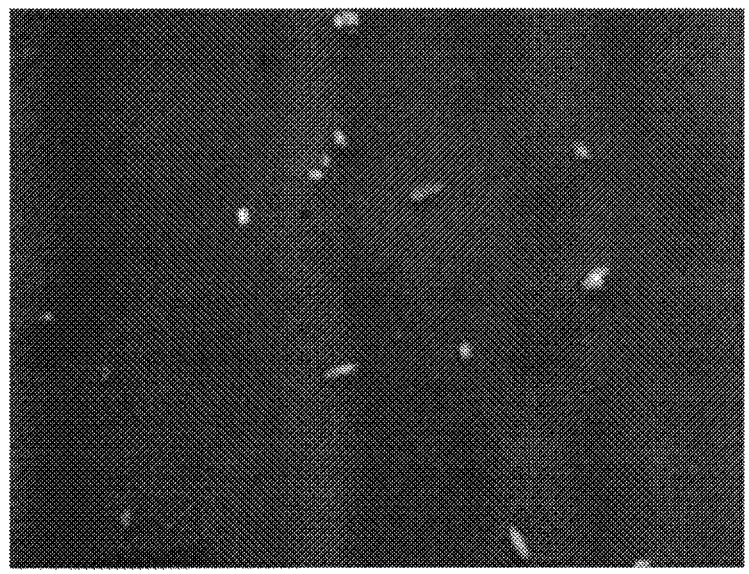
FIG. 8 is a micrograph showing the poly(N-methylcarbazole) columnar structure produced under the condition of an electrification amount of 1 mC/cm$^2$ in Example 2.
Figure 9:
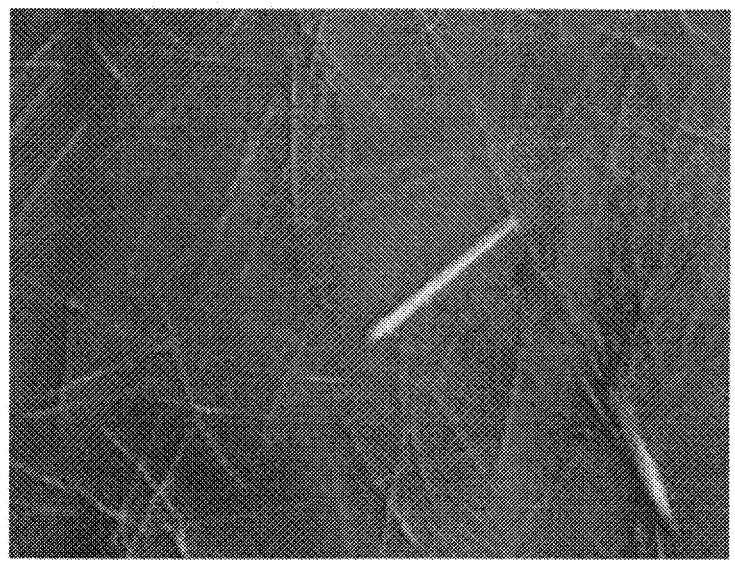
FIG. 9 is a micrograph showing the poly(N-methylcarbazole) columnar structure produced under the condition of an electrification amount of 5 mC/cm$^2$ in Example 2.
Figure 10:
FIG. 10 is a micrograph showing the poly(N-methylcarbazole) columnar structure produced under the condition of an electrification amount of 10 mC/cm$^2$ in Example 2.
Figure 11:
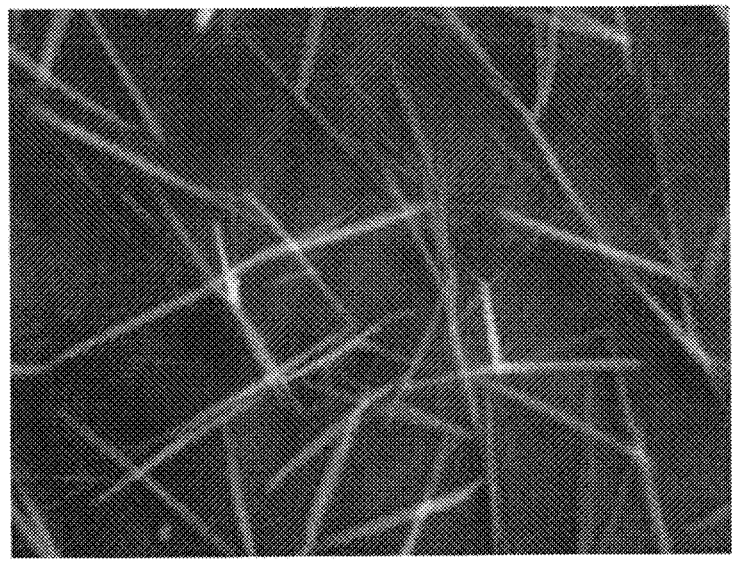
FIG. 11 is a micrograph showing the poly(N-methylcarbazole) columnar structure produced under the condition of an electrification amount of 30 mC/cm$^2$ in Example 2.
Figure 12:
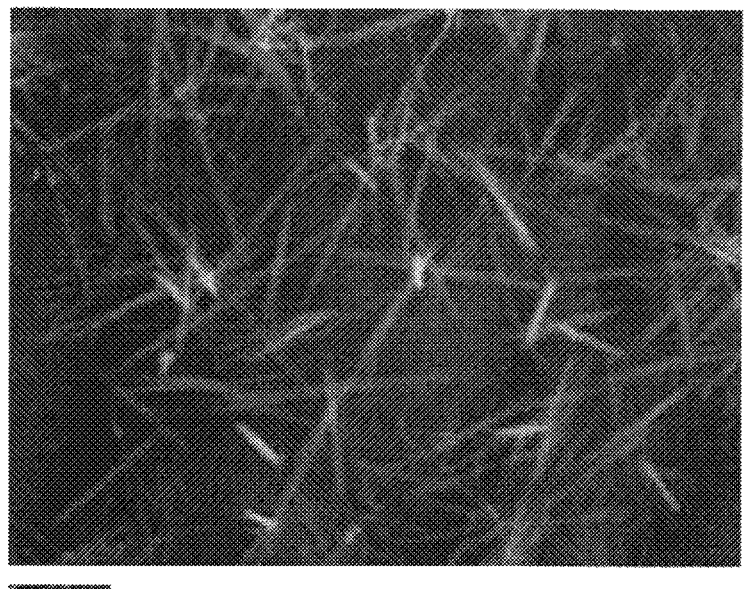
FIG. 12 is a micrograph showing the poly(N-methylcarbazole) columnar structure produced under the condition of an electrification amount of 60 mC/cm$^2$ in Example 2.
Figure 13:
FIG. 13 is a micrograph showing the poly(N-methylcarbazole) columnar structure produced under the condition of an electrification amount of 2.4 mC/cm$^2$ in Example 3.
Figure 14:
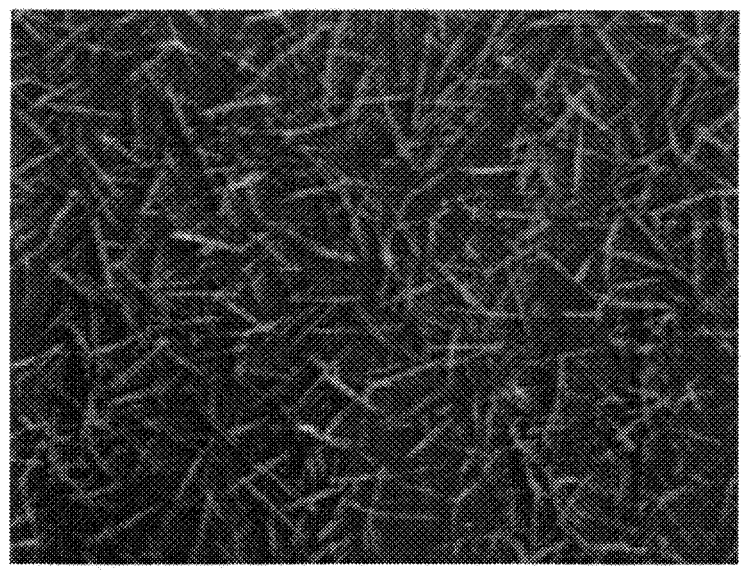
FIG. 14 is a micrograph showing the poly(N-methylcarbazole) columnar structure produced under the condition of an electrification amount of 5 mC/cm$^2$ in Example 3.
Figure 15:
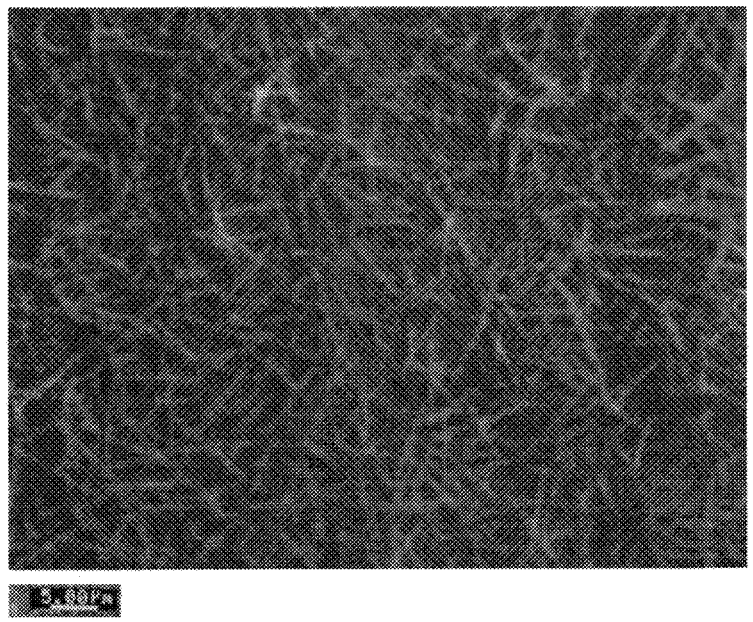
FIG. 15 is a micrograph showing the poly(N-methylcarbazole) columnar structure produced under the condition of an electrification amount of 10 mC/cm$^2$ in Example 3.
Figure 16:
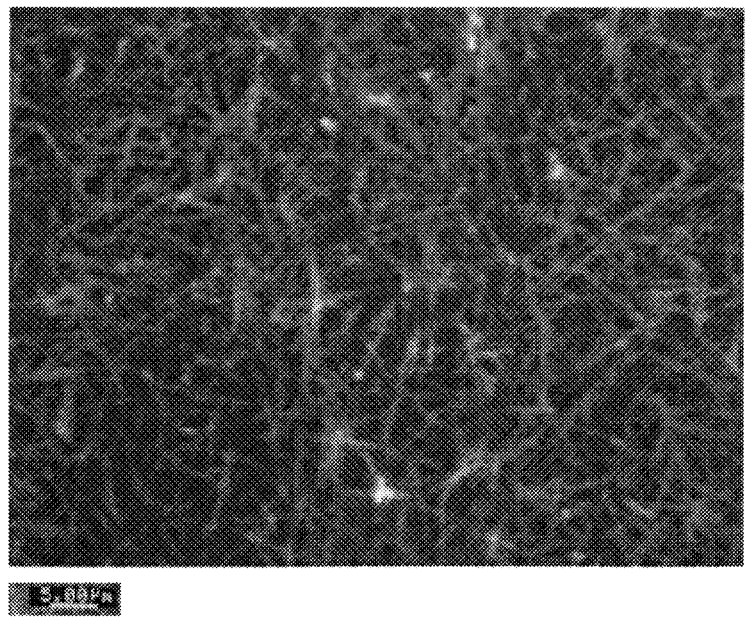
FIG. 16 is a micrograph showing the poly(N-methylcarbazole) columnar structure produced under the condition of an electrification amount of 30 mC/cm$^2$ in Example 3.

N-methylcarbazole was added to 20 mL of methanol to make a final concentration of 10 mM, to which tetrabutylammonium perchlorate as a supporting electrolyte was further added to make a final concentration of 0.1 M. Polymerization was performed with the resulting solution using ITO as a working electrode, a platinum plate as a counter electrode, and a saturated calomel electrode as a reference electrode, at a polymerization potential of 1.1 V and an electrification amount of 30 mC/cm$^2$, thereby producing a poly(N-methylcarbazole) columnar structure. Poly(N-methylcarbazole) columnar structures were produced while changing the temperature condition on the electrolytic polymerization. SEM micrographs of the poly(N-methylcarbazole) columnar structures thus produced on the working electrode are shown in FIGS. 2 to 7. FIGS. 3-1 and 3-2 are enlarged micrographs of the columnar structure in FIG. 3, and FIGS. 7-1 and 7-2 are enlarged micrographs of the columnar structure in FIG. 7.

The polymerization temperature was changed to the following six conditions.

| (1) | −20° C. | (FIG. 2) |
|---|---|---|
| (2) | −10° C. | (FIG. 3) |
| (3) | 0° C. | (FIG. 4) |
| (4) | 10° C. | (FIG. 5) |
| (5) | 20° C. | (FIG. 6) |
| (6) | 40° C. | (FIG. 7) |

The diameters of the resulting columnar structures are as follows.

| (1) | 0.6 µm |
|---|---|
| (2) | 0.7 µm |
| (3) | 0.6 µm |
| (4) | 0.3 µm |
| (5) | 0.4 µm |
| (6) | 0.3 µm |

Example 2

N-methylcarbazole was added to 20 mL of methanol to make a final concentration of 10 mM, to which tetrabutylammonium perchlorate as a supporting electrolyte was further added to make a final concentration of 0.1 M. Polymerization was performed with the resulting solution using ITO as a working electrode, a platinum plate as a counter electrode, and a saturated calomel electrode as a reference electrode, at a polymerization potential of 1.1 V and a temperature of −10° C., thereby producing a poly(N-methylcarbazole) columnar structure. Poly(N-methylcarbazole) columnar nanostructures were produced while changing the electrification amount on the electrolytic polymerization. SEM micrographs of the poly(N-methylcarbazole) columnar nanostructures thus produced on the working electrode are shown in FIGS. 8 to 12.

The electrification amount was changed to the following five conditions.

| (7) | 1 mC/cm$^2$ | (FIG. 8) |
|---|---|---|
| (8) | 5 mC/cm$^2$ | (FIG. 9) |
| (9) | 10 mC/cm$^2$ | (FIG. 10) |
| (10) | 30 mC/cm$^2$ | (FIG. 11) |
| (11) | 60 mC/cm$^2$ | (FIG. 12) |

The diameters of the resulting columnar structures are as follows.

| (7) | 1.3 µm |
|---|---|
| (8) | 1.0 µm |
| (9) | 0.9 µm |
| (10) | 1.5 µm |
| (11) | 1.1 µm |

Example 3

N-methylcarbazole was added to 20 mL of methanol to make a final concentration of 10 mM, to which tetrabutylammonium perchlorate as a supporting electrolyte was further added to make a final concentration of 0.1 M. Polymerization was performed with the resulting solution using ITO as a working electrode, a platinum plate as a counter electrode, and a saturated calomel electrode as a reference electrode, at a polymerization potential of 1.1 V and a temperature of 20° C., thereby producing a poly(N-methylcarbazole) columnar structure. Poly(N-methylcarbazole) columnar structures were produced while changing the electrification amount on the electrolytic polymerization. SEM micrographs of the poly(N-methylcarbazole) columnar structures thus produced on the working electrode are shown in FIGS. 13 to 16.

The electrification amount was changed to the following four conditions.

| (12) | 2.4 mC/cm$^2$ | (FIG. 13) |
|---|---|---|
| (13) | 5 mC/cm$^2$ | (FIG. 14) |
| (14) | 10 mC/cm$^2$ | (FIG. 15) |
| (15) | 30 mC/cm$^2$ | (FIG. 16) |

The diameters of the resulting columnar structures are as follows.

| (12) | 0.5 µm |
|---|---|
| (13) | 0.4 µm |
| (14) | 0.4 µm |
| (15) | 0.4 µm |

Example 4

Figure 17:
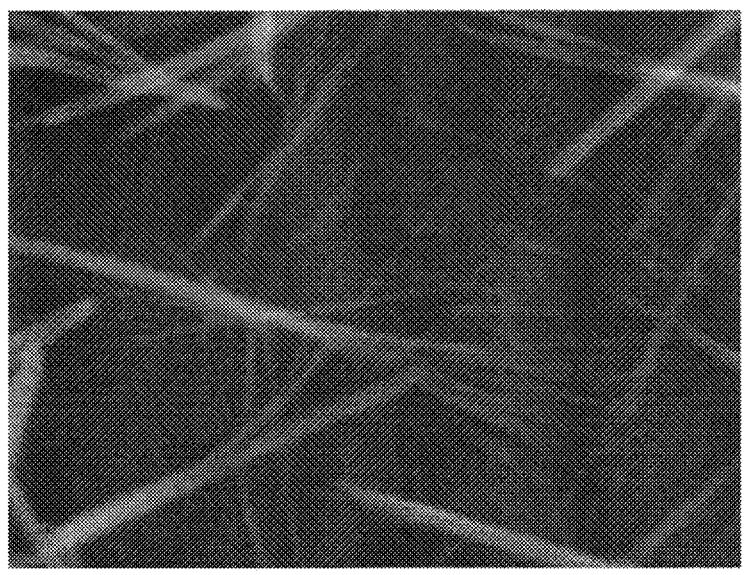
FIG. 17 is a micrograph showing the poly(N-methylcarbazole) columnar structure produced under the condition of an N-methylcarbazole concentration of 10 mM in Example 4.
Figure 18:
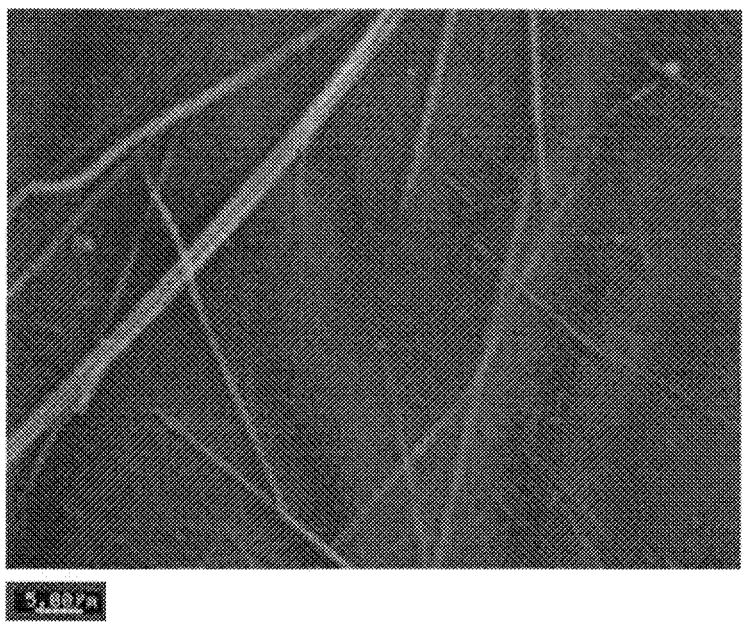
FIG. 18 is a micrograph showing the poly(N-methylcarbazole) columnar structure produced under the condition of an N-methylcarbazole concentration of 15 mM in Example 4.
Figure 19:
FIG. 19 is a micrograph showing the poly(N-methylcarbazole) columnar structure produced under the condition of an N-methylcarbazole concentration of 20 mM in Example 4.

N-methylcarbazole was added to 20 mL of methanol to make a final concentration shown below, to which tetrabutylammonium perchlorate as a supporting electrolyte was further added to make a final concentration of 0.1 M. Polymerization was performed with the resulting solution using ITO as a working electrode, a platinum plate as a counter electrode, and a saturated calomel electrode as a reference electrode, at a polymerization potential of 1.1 V, a temperature of −10° C. and an electrification amount of 30 mC/cm$^2$, thereby producing a poly(N-methylcarbazole) columnar structure. Poly(N-methylcarbazole) columnar structures were produced while changing the concentration of N-methylcarbazole. SEM micrographs of the poly(N-methylcarbazole) columnar structures thus produced on the working electrode are shown in FIGS. 17 to 19.

The concentration of N-methylcarbazole was changed to the following three conditions.

| (16) | 10 mM | (FIG. 17) |
|---|---|---|
| (17) | 15 mM | (FIG. 18) |
| (18) | 20 mM | (FIG. 19) |

The diameters of the resulting columnar structures are as follows.

| (16) | 1.0 µm |
|---|---|
| (17) | 0.6 µm |
| (18) | 0.4 µm |

Example 5

Figure 20:
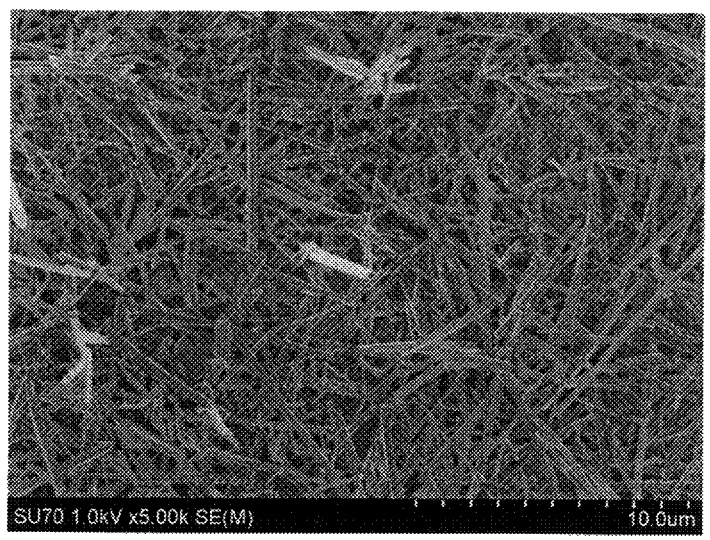
FIG. 20 is a micrograph showing the poly(N-methylcarbazole) columnar structure produced under the condition of an N-methylcarbazole concentration of 5 mM in Example 5.
Figures 1, 20:
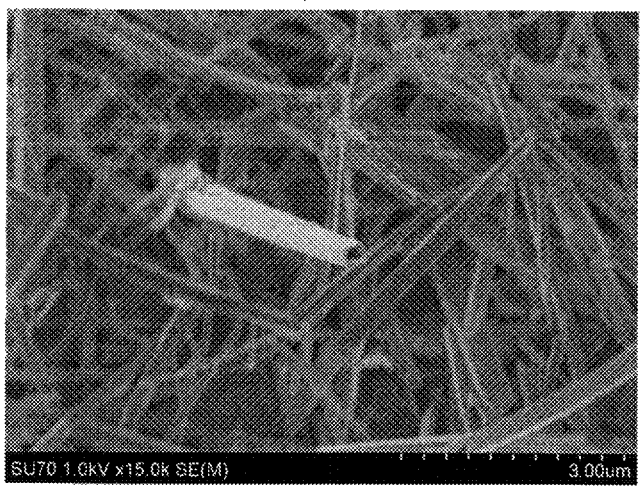
Figures 2, 20:
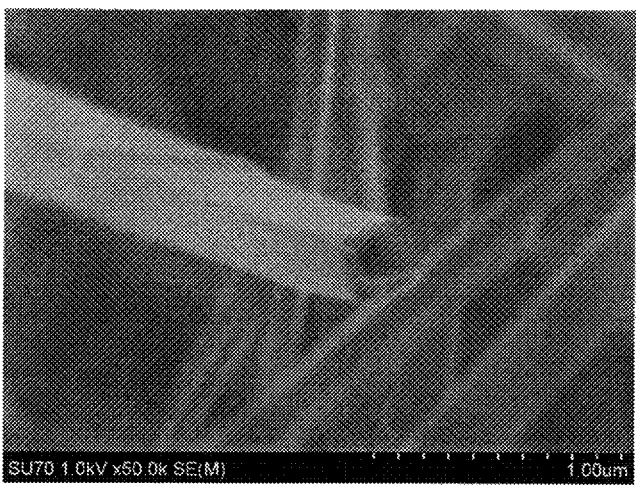
Figure 21:
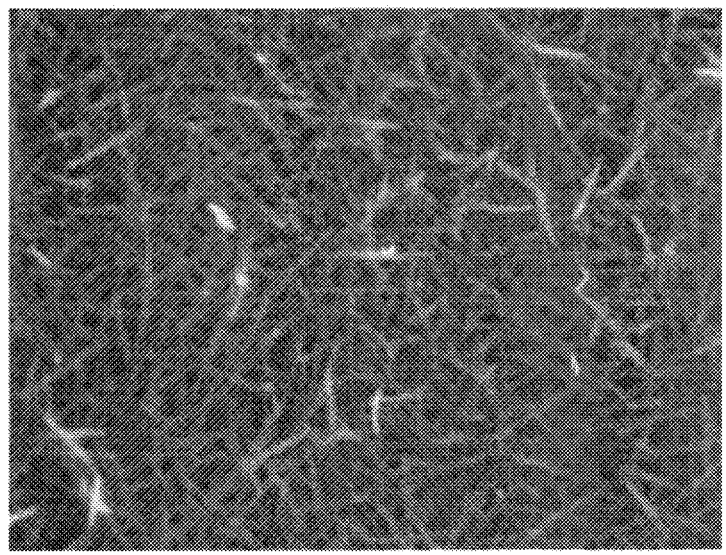
FIG. 21 is a micrograph showing the poly(N-methylcarbazole) columnar structure produced under the condition of an N-methylcarbazole concentration of 10 mM in Example 5.
Figure 22:
FIG. 22 is a micrograph showing the poly(N-methylcarbazole) columnar structure produced under the condition of an N-methylcarbazole concentration of 20 mM in Example 5.
Figures 1, 22:
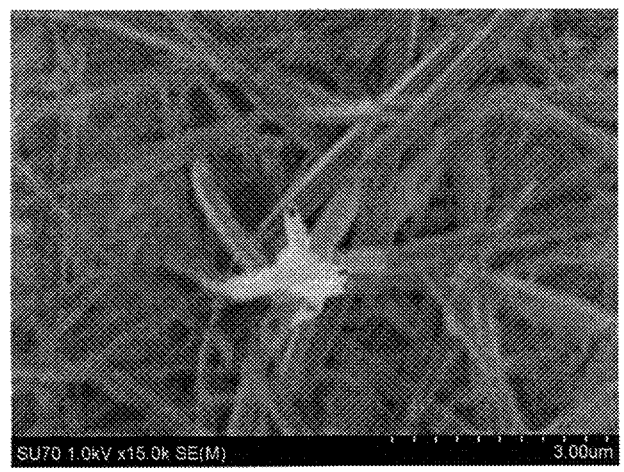
Figures 2, 22:
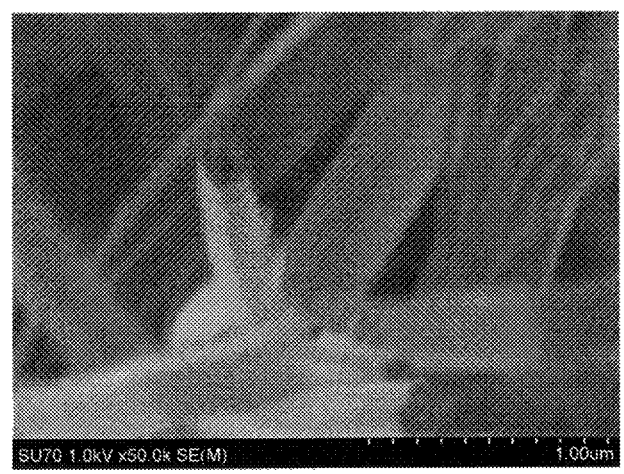

N-methylcarbazole was added to 20 mL of methanol to make a final concentration shown below, to which tetrabutylammonium perchlorate as a supporting electrolyte was further added to make a final concentration of 0.1 M. Polymerization was performed with the resulting solution using ITO as a working electrode, a platinum plate as a counter electrode, and a saturated calomel electrode as a reference electrode, at a polymerization potential of 1.1 V, a temperature of 20° C. and an electrification amount of 30 mC/cm$^2$, thereby producing a poly(N-methylcarbazole) columnar structure. Poly(N-methylcarbazole) columnar nanostructures were produced while changing the concentration of N-methylcarbazole. SEM micrographs of the poly(N-methylcarbazole) columnar nanostructures thus produced on the working electrode are shown in FIGS. 20 to 22. FIGS. 20-1 and 20-2 are enlarged micrographs of the columnar structure in FIG. 20, and FIGS. 22-1 and 22-2 are enlarged micrographs of the columnar structure in FIG. 22.

The concentration of N-methylcarbazole was changed to the following three conditions.

| (19) | 5 mM | (FIG. 20) |
|---|---|---|
| (20) | 10 mM | (FIG. 21) |
| (21) | 20 mM | (FIG. 22) |

The diameters of the resulting columnar structures are as follows.

| (19) | 0.2 µm |
|---|---|
| (20) | 0.4 µm |
| (21) | 0.3 µm |

Example 6

N-ethylcarbazole was added to 20 mL of methanol to make a final concentration of 10 mM, to which tetrabutylammonium perchlorate as a supporting electrolyte was further added to make a final concentration of 0.1 M. Polymerization was performed with the resulting solution using ITO as a working electrode, a platinum plate as a counter electrode, and a saturated calomel electrode as a reference electrode, at a polymerization potential of 1.1 V, a temperature of −10° C. and an electrification amount of 30 mC/cm$^2$, thereby producing a poly(N-ethylcarbazole) columnar structure. The columnar structure thus produced was in the form of a string and had an average length of 20 µm and an average diameter of 1 µm.

The poly(N-alkylcarbazole) columnar structure of the invention is a novel nanosized or microsized material of an electroconductive polymer. The structure of the invention has a nanosized or microsized columnar structure and thus has a large surface area. In particular, the poly(N-alkylcarbazole) columnar structure of the invention having a hollow structure has a remarkably increased surface area. Accordingly, the poly(N-alkylcarbazole) columnar structure of the invention achieves increased reaction efficiency, whereby the columnar structure of the invention is useful as (1) an electroconductive material, such as an electromagnetic wave absorbing material, (2) a wiring material, such as a cable, (3) a material for a secondary battery and a capacitor, (4) a catalyst, (5) antibacterial fibers, (6) a probe for a probe microscope, (7) an electron emission source, and the like, and can be applied to various fields of art.

What is claimed is:
1. A poly(N-alkylcarbazole) columnar structure.
2. The poly(N-alkylcarbazole) columnar structure according to claim 1, wherein the columnar structure has a diameter of from 0.1 to 10 µm.

3. A poly(N-alkylcarbazole) columnar structure according to claim 1, wherein the columnar structure is formed by electrolytically polymerizing an N-alkylcarbazole in an alcohol solvent, wherein electrolytically polymerizing the N-alkylcarbazole involves applying a voltage between a working electrode and a counter electrode of from +0.5 to +3.0 V with respect to a reference electrode or applying a voltage between an anode and a cathode of from +0.9 to +4.0 V when the reference electrode is not used.

4. The poly(N-alkylcarbazole) columnar structure according to claim 3, wherein the alcohol solvent contains from 1 mM to 10 M of a supporting electrolyte.

5. The poly(N-alkylcarbazole) columnar structure according to claim 4, wherein the supporting electrolyte is tetrabutylammonium perchlorate.

6. The poly(N-alkylcarbazole) columnar structure according to claim 1, wherein the columnar structure is a hollow columnar structure.

7. A method for producing a poly(N-alkylcarbazole) columnar structure by polymerizing an N-alkylcarbazole, the method comprising electrolytically polymerizing the N-alkylcarbazole in an alcohol solvent containing a supporting electrolyte, wherein electrolytically polymerizing the N-alkylcarbazole involves applying a voltage between a working electrode and a counter electrode of from +0.5 to +3.0 V with respect to a reference electrode or applying a voltage between an anode and a cathode of from +0.9 to +4.0 V when the reference electrode is not used.

8. The poly(N-alkylcarbazole) columnar structure according to claim 2, wherein the columnar structure is a hollow columnar structure.

9. The poly(N-alkylcarbazole) columnar structure according to claim 3, wherein the columnar structure is a hollow columnar structure.

10. The poly(N-alkylcarbazole) columnar structure according to claim 4, wherein the columnar structure is a hollow columnar structure.

11. The poly(N-alkylcarbazole) columnar structure according to claim 5, wherein the columnar structure is a hollow columnar structure.

12. The poly(N-alkylcarbazole) columnar structure according to claim 1, wherein the columnar structure is in the form selected from a cylindrical column and a polygonal column.

13. The poly(N-alkylcarbazole) columnar structure according to claim 1, wherein the columnar structure has a length of 1 μm or more.

* * * * *